United States Patent
Chanez et al.

(10) Patent No.: US 10,518,890 B2
(45) Date of Patent: Dec. 31, 2019

(54) PROPULSION ASSEMBLY FOR AN AIRCRAFT, COMPRISING A GAS GENERATOR AND TWO OFFSET FANS

(71) Applicant: SAFRAN AIRCRAFT ENGINES, Paris (FR)

(72) Inventors: Philippe Gerard Chanez, Paris (FR); Mathieu Patrick Jean-Louis Lallia, Paris (FR); Christian Sylvain Vessot, Paris (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 518 days.

(21) Appl. No.: 15/346,612

(22) Filed: Nov. 8, 2016

(65) Prior Publication Data

US 2017/0137135 A1 May 18, 2017

(30) Foreign Application Priority Data

Nov. 13, 2015 (FR) ...................... 15 60904

(51) Int. Cl.
*B64D 27/18* (2006.01)
*B64D 33/02* (2006.01)
(Continued)

(52) U.S. Cl.
CPC ............. *B64D 27/18* (2013.01); *B64D 27/12* (2013.01); *B64D 33/02* (2013.01); *F02C 7/05* (2013.01);
(Continued)

(58) Field of Classification Search
CPC ........ B64D 27/18; B64D 27/12; B64D 33/02; F02C 7/05; F02K 1/52; F02K 3/06
See application file for complete search history.

(56) References Cited

U.S. PATENT DOCUMENTS 3,054,577 A * 9/1962 Wolf ...................... B64D 27/12
244/110 B
3,229,933 A 1/1966 Kutney
(Continued)

FOREIGN PATENT DOCUMENTS

DE 1216117 B 5/1966
FR 3009028 A1 1/2015

OTHER PUBLICATIONS

French Search Report with English Language Translation Cover Sheet, dated Apr. 15, 2016, FR Application No. 1560904.

*Primary Examiner* — Justin M Benedik
(74) *Attorney, Agent, or Firm* — Womble Bond Dickinson (US) LLP

(57) ABSTRACT

The invention relates to an aircraft propulsion assembly (10), comprising a single gas generator (11) and two fans (12) drive in rotation by the gas generator (11) and offset on either side of a vertical plane passing through a longitudinal axis (X) of the gas generator, the rotational axes of the fans lying substantially in the same fan plane.
According to the invention, the propulsion assembly (10) comprises an air inlet fairing formed upstream of a nacelle (25) connecting the fans, said fairing (15) having, between the fans (12), an air inlet opening (17, 17') lying substantially perpendicular to the fan plane and on either side of this plane, the propulsion assembly further comprising an air supply device configured so as to supply the gas generator (11) with a part of the incoming air and to take off, from the remaining part of the incoming air, a cooling airflow intended to cool elements of the propulsion assembly and/or a wing supporting the propulsion assembly.

12 Claims, 3 Drawing Sheets

(51) Int. Cl.
  *F02C 7/05* (2006.01)
  *B64D 27/12* (2006.01)
  *F02K 3/077* (2006.01)
  *F02K 1/52* (2006.01)
  *F02K 3/06* (2006.01)

(52) U.S. Cl.
  CPC ............... *F02K 1/52* (2013.01); *F02K 3/06* (2013.01); *F02K 3/077* (2013.01); *B64D 2033/0286* (2013.01); *F05D 2240/40* (2013.01); *F05D 2250/312* (2013.01)

(56) References Cited

U.S. PATENT DOCUMENTS

| | | | |
|---|---|---|---|
| 6,792,745 B2 * | 9/2004 | Wojciechowski | F02K 3/06 60/224 |
| 8,015,796 B2 * | 9/2011 | Babu | F01D 13/003 60/226.1 |
| 9,096,312 B2 * | 8/2015 | Moxon | B64D 27/12 |
| 9,297,270 B2 * | 3/2016 | Suciu | F01D 15/12 |
| 2008/0098719 A1 * | 5/2008 | Addis | B64D 27/10 60/226.1 |
| 2009/0229243 A1 * | 9/2009 | Guemmer | B64D 27/12 60/226.1 |
| 2010/0011741 A1 | 1/2010 | Babu et al. | |
| 2014/0183296 A1 | 7/2014 | Suciu et al. | |

* cited by examiner

PROPULSION ASSEMBLY FOR AN AIRCRAFT, COMPRISING A GAS GENERATOR AND TWO OFFSET FANS

1. FIELD OF THE INVENTION

The present invention relates to the aeronautical field and relates to a propulsion assembly comprising at least two fans driven by a gas generator.

2. PRIOR ART

Novel propulsion assembly architectures comprising at least two fans offset with respect to a gas generator, usually under the wings of an aircraft, have been proposed in order to optimise the propulsion efficiency by means of a high bypass ratio (BPR) while keeping an acceptable ground clearance and fans of small size. The by pass ratio is the ratio between the flow rates of the secondary flow or cold flow passing through the fan or fans to generate a thrust and a primary flow or hot flow passing through the gas generator. Such an architecture provides for the fans and the gas generator each to be disposed in casings that more or less abut each other. These casings are extended downstream with reference to the flow of the gases in the propulsion assembly and the casing of the gas generator is disposed so as to straddle the fan casings. This architecture is known from the documents U.S. 2009/0229243, FR 3009028, U.S. 2014/0183296 and U.S. 2010/0011741.

Because of the offset fans on the sides of the gas generator, and since the air inlet thereof is disposed in a small space provided between the two fan casings, this space generates a sonic or even supersonic flow, which involves strong drag, impairing the efficiency of the propulsion assembly. Another drawback of this architecture lies in the fact that the air inlet of the gas generator is liable to take in particles, also referred to as foreign bodies, such as sand, hail, birds or the like.

3. OBJECT OF THE INVENTION

The object of the present invention is to provide a propulsion assembly making it possible in particular to reduce aerodynamic drag.

4. DISCLOSURE OF THE INVENTION

This object is achieved in accordance with the invention by virtue of an aircraft propulsion assembly comprising a single gas generator and two fans drive in rotation by the gas generator and offset on either side of a vertical plane passing through a longitudinal axis of the gas generator, the rotational axes of the fans lying substantially in the same fan plane, the propulsion assembly comprising an air inlet fairing formed upstream of a nacelle connecting the fans, said fairing having, between the fans, an air inlet opening lying substantially perpendicular to the fan plane and on either side of this plane, the propulsion assembly further comprising an air supply device configured so as to supply the gas generator with a part of the air entering through the air inlet opening and to take off, from the remaining part of the air entering through the air inlet opening, a cooling airflow intended to cool elements of the propulsion assembly and/or a wing supporting the propulsion assembly.

Thus this solution makes it possible to achieve the aforementioned object. Having a faired air inlet forming part of a nacelle connecting the two fans, between the small space situated between the two fans, makes it possible to fill in this inter-fan space or zone that is subject to high Machs. This configuration also makes it possible to supply the gas generator while cooling said generator and/or adjacent equipment with cool air, while negatively affecting the aerodynamic drag as little as possible. The cool air that enters the air inlet cools the gas generator and adjacent elements directly without passing through the fans.

According to one feature of the invention, the fairing has a front wall arranged between the fans and upstream of the gas generator, the front wall being provided with the air inlet opening.

According to another advantageous feature, the nacelle encloses at least the upstream part of the fan casings.

According to one feature of the invention, the longitudinal axis of the gas generator passes inside the air inlet opening.

According to another feature of the invention, the air inlet fairing is free. In other words there is no fan installed in front of the inlet of the gas generator.

According to another feature of the invention, the fans have air inlet lips defined in the same plane.

According to another feature of the invention, the fans have air inlet lips defined in planes that are offset axially and substantially parallel. In this way, in a typical configuration in which the leading edge of the wing forms a sweep angle with the axis of the fuselage, this arrangement allows an even distribution of the flow between the inner and outer fans, in particular during a climbing phase of the aircraft, preventing the incident air entering the fans from being disturbed by the leading edge of the wing.

Advantageously, but in a non-limiting manner, the air inlet opening is situated substantially in the same plane as the one defined by the air inlet lip of the fan furthest downstream. This also makes it possible for the air inlet opening not to be disturbed by the leading edge of the wing.

According to another feature of the invention, the air inlet opening is formed in a single part. This configuration is simple in design.

According to one embodiment of the invention, the air inlet opening is formed by two parts distributed on either side of the fan plane and separated from each other by a wall.

According to another feature of the invention, the air inlet opening or the two air inlet openings is or are curved. This curving makes it possible to adapt to the walls of the fans, which generally have a circular cross section.

According to another feature of the invention, the air inlet opening is symmetrical with respect to a vertical plane passing through the longitudinal axis of the gas generator.

According to yet another feature of the invention, the longitudinal axis of the gas generator is situated above the fan plane, and the air supply device comprises an air inlet sleeve supplying the gas generator, said air inlet sleeve comprising, upstream, an inlet pipe having an opening situated essentially below the fan plane. Such a configuration makes it possible to offset/misalign the inlet of the gas generator, the purpose of which is to protect the gas generator from foreign bodies (known by the abbreviation FOD, standing for "foreign object debris") coming from outside.

According to yet another feature of the invention, the air supply device comprises a ventilation pipe situated essentially above the fan plane and from which the cooling airflow is taken. In this way, part of the air discharged then forms a fluid protection film for protecting the pressure surface of the wing from excessive heat from the exhaust gases issuing from the gas generator, and the other part of the air entering the inlet opening is taken into the inlet pipe to supply the gas generator.

The invention also relates to an aircraft wing supporting a propulsion assembly according to any of the aforementioned features.

5. BRIEF DESCRIPTION OF THE DRAWINGS

The invention will be understood better and other aims, details, features and advantages thereof will emerge more clearly from reading the following detailed explanatory description of embodiments of the invention given by way of purely illustrative and non-limiting examples, with reference to the accompanying schematic drawings, in which.

6. DESCRIPTION OF EMBODIMENTS OF THE INVENTION

Figure 1:
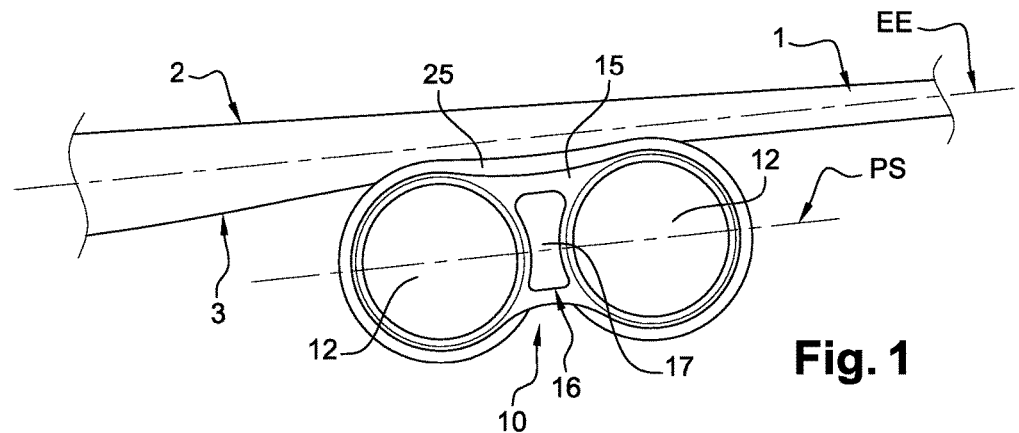
FIG. 1 is a partial front view of an aircraft wing supporting a propulsion assembly according to the invention.

FIG. 1 is a partial view of one of the propulsion wings or lateral wings 1 for the lift of an aircraft, in particular an aeroplane (not shown), inserted into a fuselage of the aircraft. This wing 1 extends in a span direction E-E from the fuselage and comprises a so-called top suction surface 2 and a so-called bottom pressure surface 3 that are opposite with respect to a plane comprising the span direction E-E. The pressure and suction surfaces 2, 3 are connected to each other by a leading edge 4 upstream and a trailing edge 5 downstream of the wing. In the present invention the terms "upstream" and "downstream" are defined with respect to the direction of travel of the aircraft.

A propulsion assembly 10 supported by each propulsion wing 1 comprises a gas generator 11 having a longitudinal axis X substantially parallel to the elongation axis of the fuselage, and two fans 12 with axes offset with respect to a vertical plane passing through the axis of the gas generator. The fans are disposed on either side of the gas generator. Preferably, but in a non-limiting manner, the axes of the fans are defined in the same plane PS. This plane PS is substantially parallel to the plane in which the span direction E-E is defined, that is to say the wing 1 of the aeroplane.

The fans 12 are separated from each other so as to allow installation of the gas generator 11. The longitudinal axis X of the gas generator 11 may lie in the same plane PS as the axes of the fans or may be offset vertically with respect to the plane of the axes of the fans, which makes it possible to bring the fans 12 closer to each other.

To this end, the gas generator 11 is housed in a casing 13 and the fans 12 are each disposed in a fan casing 14. The casings 13, 14 are attached directly to the framework of the wing 1 or via a strut (not shown). The gas generator 11 may be disposed behind the fan casings (cf. FIG. 2) or at least partly between the fan casings (cf. FIGS. 3 and 4).

The top part of the casings 13, 14 is arranged substantially in the same plane. This configuration makes it possible to facilitate the attachment of the propulsion assembly. In the present invention, the terms "top" and "bottom" are defined with respect to a vertical direction, the aircraft generally being positioned so as to be substantially horizontal.

The fans 12 are driven via a power transmission mechanism (not shown) coupled to the shaft of the gas generator or by a gas flow taken from the gas generator.

The gas generator 11 comprises, from upstream to downstream, at least one inlet opening 11e (cf. FIG. 8), a compressor, a combustion chamber and a turbine. The casing 13 of the gas generator ends downstream in a gas discharge pipe. It may be mono- or multi-flow, single- or multi-body, according to requirements. The casing 13 of the gas generator has a roughly cylindrical shape.

The propulsion assembly 10 also comprises an air inlet fairing 15 having a front wall 16 provided with an air inlet opening 17 that extends between the fans 12. The front wall 16 is arranged between the fans 12 and upstream of the gas generator 11, in a plane transverse to the axis of the gas generator. Moreover, the front wall 16 may be symmetrical to the plane PS of the fan axes. The front wall 16 may also be symmetrical to a vertical midplane passing between the two fans 12.

Figures 2, 3:
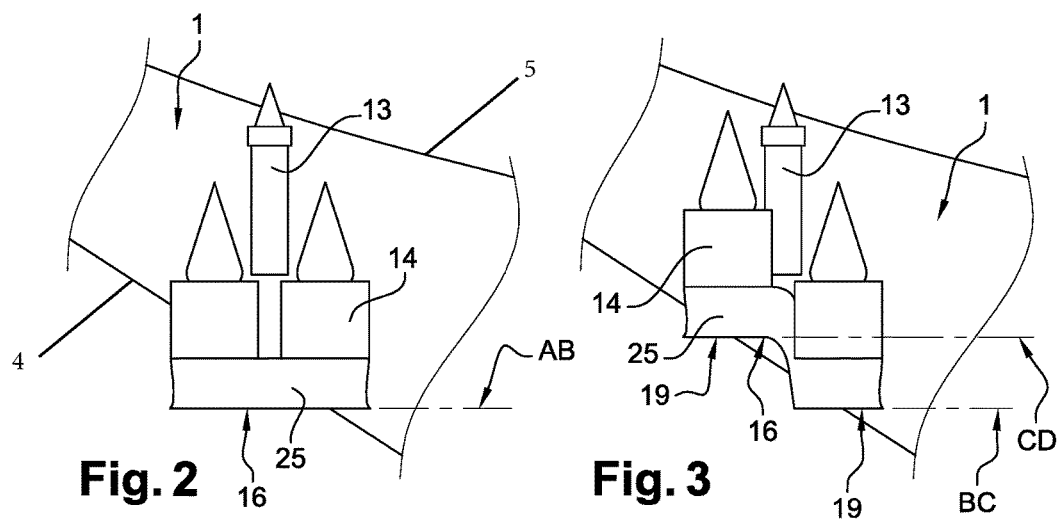
FIGS. 2 to 4 are views from below of a wing to which a propulsion assembly is attached, the fans and gas generator of which are arranged in accordance with various embodiments.
Figure 4:
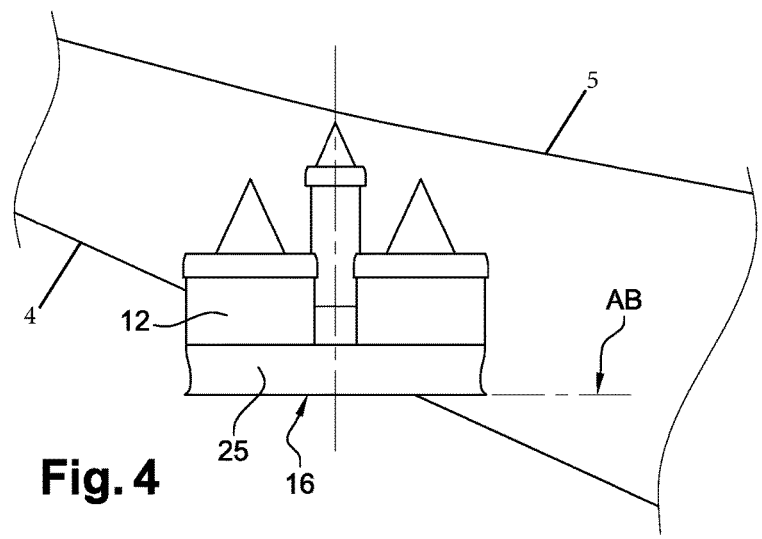
Figure 5:
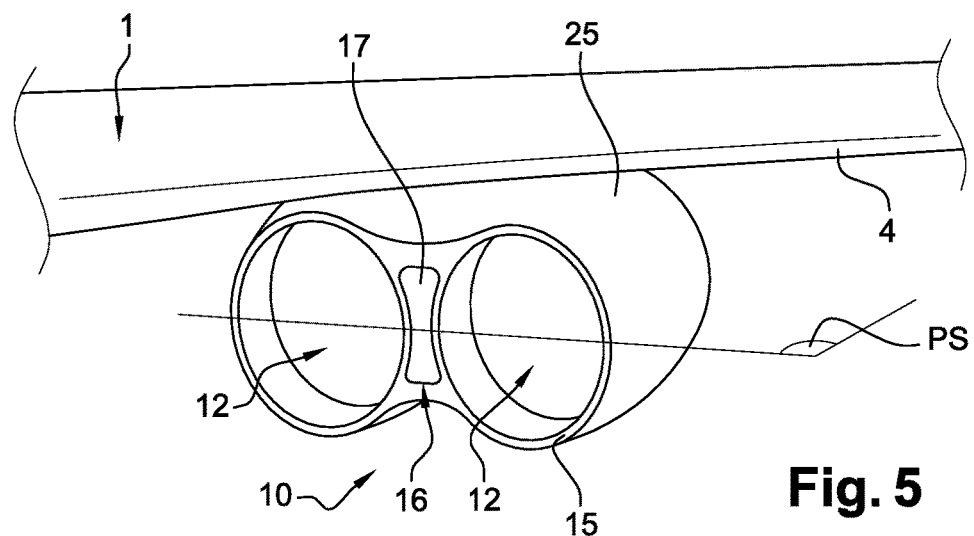
FIG. 5 is a perspective view of a wing supporting a propulsion assembly according to another embodiment of the invention.
Figure 6:
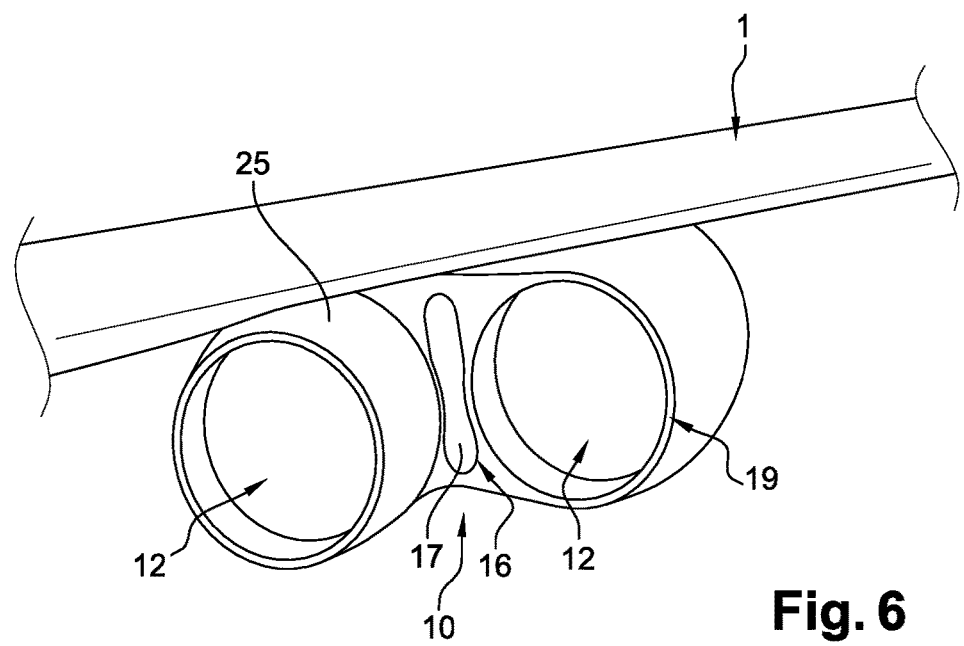
FIG. 6 is a schematic representation of another embodiment of the propulsion assembly according to the invention.

More precisely, the propulsion assembly 10 comprises a nacelle 25 that comprises the air inlet fairing 15 formed upstream thereof. The nacelle 25 advantageously, but in a non-limiting manner, encloses the upstream parts of the fan casings 13, as is illustrated in FIGS. 2 to 4. In these examples, the nacelle 25 carries the upstream parts of the fan casings and the front wall 16 is upstream of the gas generator. In FIGS. 5 and 6, the nacelle 25 forms an aerodynamic fairing entirely containing or enclosing the fans and the gas generator, as well as the air inlet opening 17.

The air inlet opening 17 is configured to supply at least the gas generator 11. This air inlet opening 17 is disposed between the two fans 12 and over the entire height of the front wall 16. In other words, the air inlet opening 17 extends on either side of the fan plane PS containing the rotational axes of the two fans. Likewise, the air inlet opening 17 is symmetrical with respect to a vertical plane passing through the longitudinal axis of the gas generator. The air inlet opening is formed in a single part 17, as can be seen in FIGS. 1, 5 and 6. Alternatively and with reference to FIG. 7, the air inlet opening is formed by two parts 17, 17' distributed on either side of the fan plane PS and separated from each other by a wall 18. The axis X of the gas generator 11 passes inside the air inlet opening 17 or one of the air inlet opening parts 17, 17'. The air inlet opening 17 has a curved shape so as to at least partly match the shape of an inter-fan zone that is delimited by air inlet lips 19 surrounding the air inlets of the fan casings, which here are circular in cross section. In particular, the air inlet opening 17 has portions that are concave towards the inside, facing each other at the fan plane PS. This curved shape may be an hourglass shape or have rounded ends as in the example with reference to FIG. 6. Naturally, any other shape making it possible to adapt to the inter-fan zone can be envisaged.

In FIGS. 2, 4 and 5, the air inlet lips 19 of the offset fans are defined in the same plane AB, which is here substantially perpendicular to the axis of the gas generator. The front wall 16 carrying the air inlet opening 17 is also defined in this plane AB.

In FIGS. 3 and 6, the fans are offset axially with respect to each other so as to follow the sweep angle of the wing of the aeroplane. In particular, the air inlet lips 19 of the offset fans 12 are defined in planes BC and CD that are offset axially with respect to each other and are substantially parallel. In this example, the planes BC and CD of the air inlet lips 19 are substantially parallel to each other and perpendicular to the axis of the gas generator. The front wall 16 is defined in the plane of the fan 12 which is situated on the same side as the free end of the wing. In other words, the air inlet opening 17 is situated substantially in the same plane CD as the one defined by the air inlet lip of the fan furthest downstream.

Figure 8:
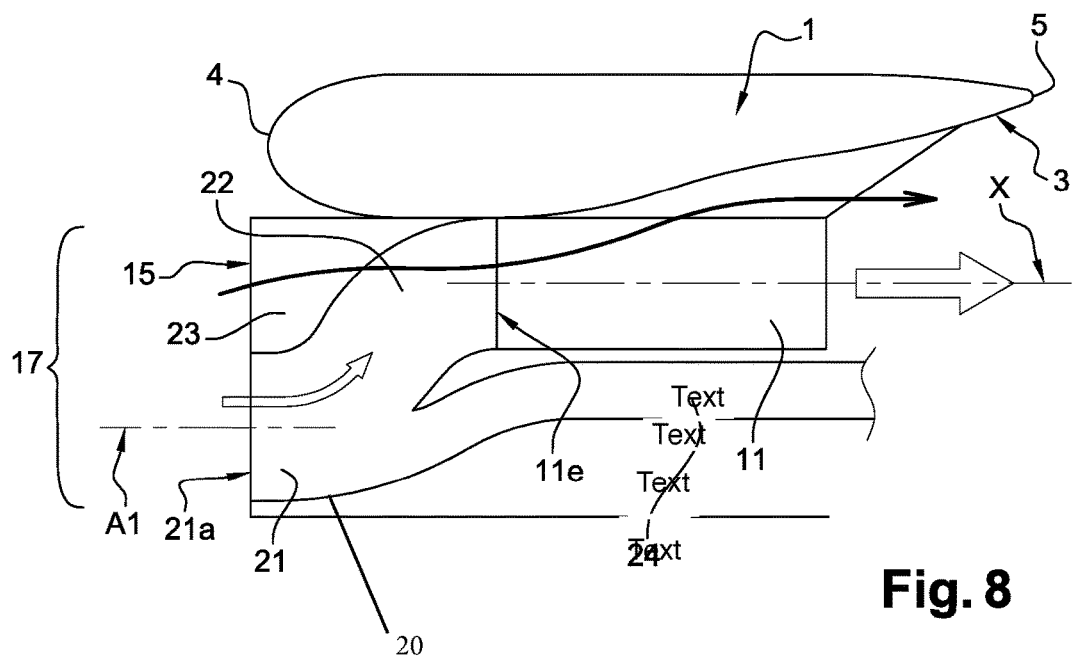
FIG. 8 is a schematic cross section of a propulsion assembly according the invention, showing an embodiment of the air supply device.

With reference to FIG. 8, the propulsion assembly also comprises an air supply device configured to supply the gas generator 11 with part of the incoming air and to take off, from the remaining part of the incoming air, a cooling airflow intended to cool elements of the propulsion assembly and/or a wing supporting the propulsion assembly. To this end, the air supply device comprises an air inlet sleeve 20 comprising an inlet pipe 21 and a supply pipe 22 for the gas generator 11 supplied by the inlet pipe 21. Said inlet pipe is oriented along a first axis A1 substantially parallel and offset with respect to the longitudinal axis X of the gas generator. The supply pipe 22 is connected to the inlet opening 11e of the gas generator 11 and is oriented along the axis X of the gas generator. The inlet pipe 21 has an opening 21a disposed here below the fan plane PS. In other words, the inlet pipe 21 and the supply pipe 22 have an axial section in an S shape, the opening 21a of which is in fluid communication with the bottom part of the air inlet opening 17 and a downstream outlet of which is fluid communication with the inlet opening 11e of the gas generator 11.

The air supply device also comprises a ventilation pipe 23 in fluid communication with the air inlet opening 17. This ventilation pipe 23 is situated essentially above the fan plane PS. Thus part of the air entering the air inlet opening 17 is taken into the ventilation pipe 23, from which cool air is taken off to cool elements of the propulsion assembly and is then discharged in particular above the primary flow that passed through the gas generator 11. The discharged air then forms a fluid protection film for protecting the pressure surface 3 of the wing 1 from the excessive heat of the exhaust gases. The other part of the air entering the air inlet opening 17 is taken into the inlet pipe 21 as described previously.

The ventilation pipe 23 is delimited partly by a wall of the inlet pipe 21, said wall separating the airflow entering the ventilation pipe 23 into ventilation flows passing along an external casing of the gas generator 11.

Figure 7:
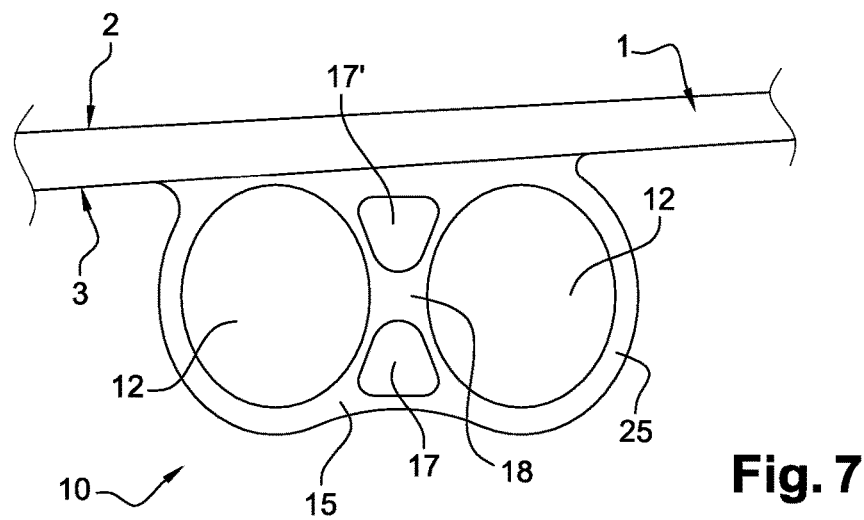
FIG. 7 is a schematic cross section of a propulsion assembly attached under a wing according to another embodiment.

With reference to FIG. 7, in which the front wall 16 comprises two air inlet opening parts 17, 17' separated from each other by a wall 18 formed by a middle part of the front wall 16, the bottom air inlet opening part 17 supplies the air inlet sleeve 20, and the top inlet opening part 17' is configured to supply the ventilation pipe 23. In this example, the top air inlet opening part 17' is situated above the middle wall 18 while the bottom air inlet opening part 17 is situated below this middle wall 18. Naturally, in another configuration of the propulsion assembly that is not shown, the bottom air inlet opening part 17 may be in fluid communication with the ventilation pipe, and the top air inlet opening part 17' in fluid communication with the air inlet sleeve 20, in which case the gas generator 11 may be disposed essentially below the fan plane PS of the propulsion assembly.

It should be noted that, in another embodiment that is not shown, an air inlet sleeve and its supply pipe supplying air to the gas generator may be disposed essentially on the same side of the fan plane as the gas generator. A particle-diversion device, to prevent ingestion of particles by the gas generator, may comprise one or more deflector elements on the path between the opening of the air inlet sleeve and the inlet opening of the gas generator. In this way, the particles, the incident path of which is directed towards the inlet opening of the gas generator, strike an inclined surface of a deflector element, in order to rebound and divert their path towards discharge zones outside this inlet opening.

The invention claimed is:

1. A propulsion assembly for an aircraft, intended to be attached below a wing of said aircraft, the assembly comprising a single gas generator and two fans being each driven in rotation by the gas generator and offset on either side of a vertical plane passing through a longitudinal axis of the gas generator, the rotational axes of the fans lying substantially in the same fan plane, wherein the propulsion assembly comprises an air inlet fairing formed upstream of a nacelle connecting the fans, said fairing having, between the fans, an air inlet opening lying substantially perpendicular to the fan plane and on either side of this plane, the propulsion assembly further comprising an air supply device configured so as to supply the gas generator with a part of the air entering through the air inlet and to take off, from the remaining part of the air entering through the air inlet opening, a cooling airflow intended to cool elements of the propulsion assembly and/or the wing supporting the propulsion assembly.

2. The assembly according to claim 1, wherein said fairing has a front wall arranged between the fans and upstream of the gas generator, the front wall being provided with the air inlet opening.

3. The assembly according to claim 1, wherein the longitudinal axis of the gas generator passes inside the air inlet opening.

4. The assembly according claim 1, wherein the fans have air inlet lips defined in the same plane.

5. The assembly according to claim 1, wherein the fans have air inlet lips defined in planes that are offset axially and substantially parallel.

6. The assembly according to claim 4, wherein the air inlet opening is situated substantially in the same plane as the one defined by the air inlet lip of the fan furthest downstream.

7. The assembly according to claim 1, wherein the air inlet opening is formed in a single part.

8. The assembly according to claim 1, wherein the air inlet opening is formed by two parts distributed on either side of the fan plane and separated from each other by a wall.

9. The assembly according to claim 1, wherein the air inlet opening is symmetrical with respect to a vertical plane passing through the longitudinal axis of the gas generator.

10. The assembly according to claim 2, wherein the longitudinal axis of the gas generator is situated above the fan plane, and the air supply device comprises an air inlet sleeve supplying the gas generator, said air inlet sleeve comprising upstream an inlet pipe having an opening situated essentially below the fan plane.

11. The assembly according to claim 10, wherein the air supply device comprises a ventilation pipe situated essentially above the fan plane and from which the cooling airflow is taken.

12. The aircraft propulsion wing, wherein the aircraft supports a propulsion assembly according to claim 1.

* * * * *